United States Patent [19]

Kuribayashi

[11] Patent Number: 4,609,942
[45] Date of Patent: Sep. 2, 1986

[54] METHOD FOR CONVERSION FROM FIELD SIGNAL TO FRAME SIGNAL

[75] Inventor: Michio Kuribayashi, Kanagawa, Japan

[73] Assignee: Fuji Photo Film Co., Ltd., Kanagawa, Japan

[21] Appl. No.: 659,317

[22] Filed: Oct. 10, 1984

[30] Foreign Application Priority Data

Oct. 11, 1983 [JP] Japan ............................. 58-188517

[51] Int. Cl.$^4$ ............................................. H04N 7/01
[52] U.S. Cl. ..................................... 352/140; 358/152
[58] Field of Search ................ 358/140, 11, 313, 152, 358/148, 160; 360/11.1

[56] References Cited

U.S. PATENT DOCUMENTS 4,280,133  7/1981  Kato ................................. 358/140 X
4,412,251  10/1983  Tanaka et al. .................... 358/140 X Primary Examiner—James J. Groody
Assistant Examiner—Victor R. Kostak

[57] ABSTRACT

Disclosed is a method for conversion from a field signal to a frame signal in which a field signal delayed by a ½ horizontal scanning period and the field signal not subjected to the delay are alternately selected at a time interval of one vertical scanning period by changing over a switch. In the conversion method, the switch is changed over under control of a switching pulse which rises to its high level before the period of preceding equalizing pulses in one field, remains in the high level for one vertical scanning period, then falls to its low level, rises to its high level again during the period of preceding equalizing pulses in the next field, and falls to its low level again during the period of succeeding equalizing pulses and which repeats the above state at a time interval of two vertical scanning periods.

4 Claims, 2 Drawing Figures

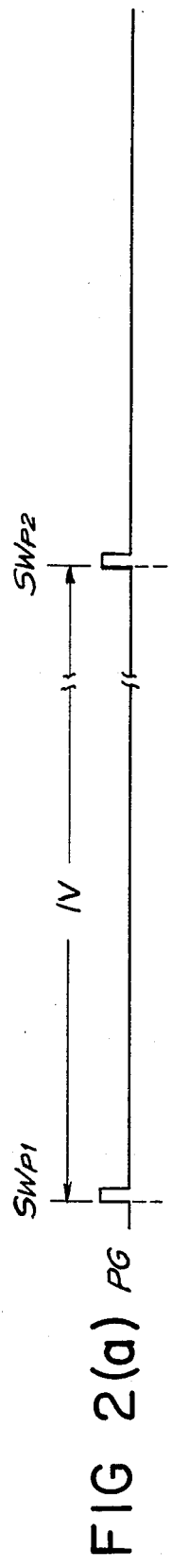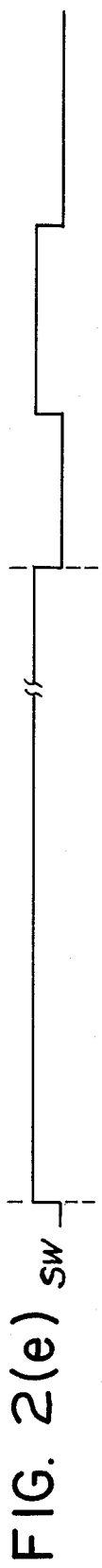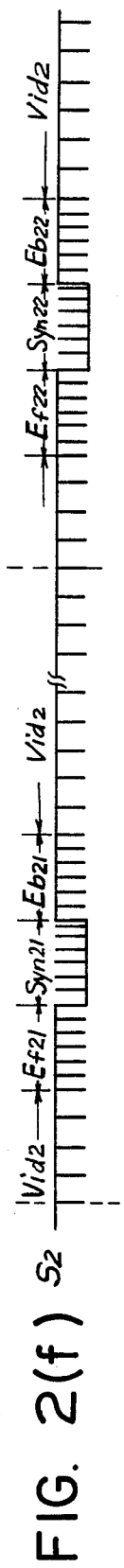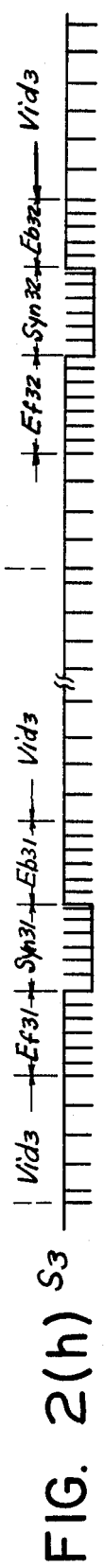
FIG. 2(a) PG
FIG. 2(b) Q3
FIG. 2(c) Q4
FIG. 2(d) Q̄5
FIG. 2(e) SW
FIG. 2(f) S2
FIG. 2(g) S1
FIG. 2(h) S3

METHOD FOR CONVERSION FROM FIELD SIGNAL TO FRAME SIGNAL

BACKGROUND OF THE INVENTION

This invention relates to a method for conversion from a field signal to a frame signal, and more particularly to an improved method of the kind above described by which a frame signal obtained by interlaced scanning can be reproduced with a circuit of simple structure.

In a method for recording a video signal on a recording medium such as a magnetic tape or a magnetic disk, one track is allotted to one field or two fields so that video signal portions are recorded in side-by-side relation with the frame period or field period, in order to facilitate reproduction of a special picture such as a still picture or a slow-motion picture. In the case where one track is allotted to one field, a method is most frequently employed in which, in the record mode, an odd-field signal portion only of a composite video signal including synchronizing signals is recorded on a track and, in the playback mode, the same track is scanned twice to obtain or reproduce the composite video signal portion corresponding to one frame. That is, conversion from a composite video signal portion corresponding to one field (referred to hereinafter as a field signal) to a composite video signal portion corresponding to one frame (referred to hereinafter as a frame signal) is attained by the method above described. The principal purpose of this method is to improve the recording density of the video signal on the recording medium.

In order to realize the effect of interlaced scanning by such a method used for conversion from a field signal to a frame signal, it is not sufficient to merely repeatedly reproduce the field signal twice, and a special contrivance must be made. This is because, while a time lag of a ½ horizontal scanning period (referred to hereinater as ½H) is required between an odd-field video signal and an even-field video signal, it is also required to maintain a time interval of one vertical scanning period (referred to hereinafter as 1 V) between their vertical synchronizing signals.

Therefore, according to a prior art conversion method of this kind, an even-field signal or an odd-field signal delayed by ½H relative to the other and the odd-field signal or the even-field signal not subjected to the delay are alternately selected by changing over a switch, and a synchronizing signal generator is separately provided to produce a signal portion including the synchronizing signals. In this manner, the field signals delayed and not delayed are selected at the time interval of 1 V by the switch for a predetermined period of time during transition from one field to the next. Thus, a frame signal is obtained in which the video signals of the adjacent fields have a relative delay of 0.5H, and the vertical synchronizing signals appear periodically at a time interval of 1 V.

However, in view of the fact that the field signal delayed by ½H, the signal portion including the synchronizing signals, and the field signal not delayed and remaining intact are sequentially repeatedly selected by the switch in the prior art conversion method of this kind, the prior art method is defective in that a complex and troublesome procedure is required for the control of the switch, and the necessity for separate provision of the synchronizing signal generator leads necessarily to the complexity of the structure of the circuit.

SUMMARY OF THE INVENTION

With a view to obviate the prior art defects pointed out above, it is a primary object of the present invention to provide an improved method for conversion from a field signal to a frame signal so that a frame signal obtained by interlaced scanning can be reproduced with a circuit of simple structure. According to the fundamental technical idea of the present invention which attains the above objects, a switching pulse rising to its high level before the period of preceding equalizing pulses in one field, remaining in its high level for a period of 1 V, then falling to its low level, rising to its high level again during the period of preceding equalizing pulses in the next field and falling to its low level again during the period of succeeding equalizing pulses, is used to control the change-over of the switch by which the filed signal delayed by ½H and the field signal not delayed are alternately selected at the time interval of 1 V.

BRIEF DESCRIPTION OF THE DRAWINGS

FIGS. 2(a) and 2(h) show waveforms appearing at various parts of the system shown in FIG. 1.

Figure 1:
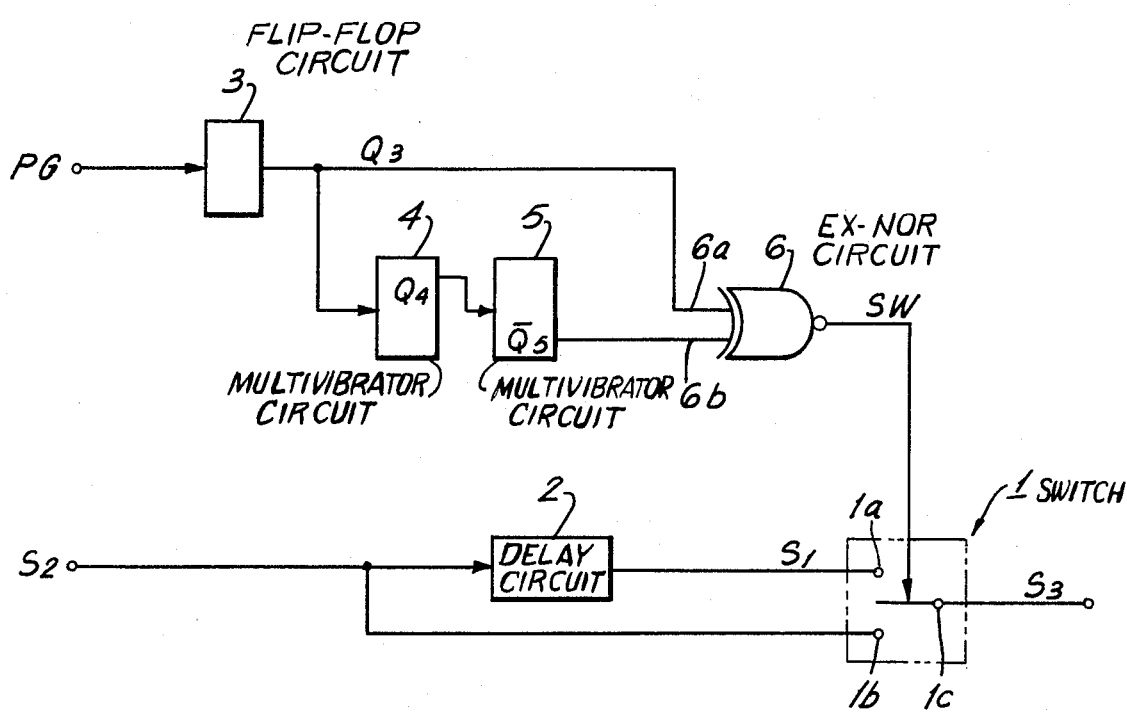
FIG. 1 is a block diagram of a system which puts into practice an embodiment of the method according to the present invention.

An embodiment of the method according to the present invention will now be described in detail with reference to the drawings.

DETAILED DESCRIPTION OF THE PREFERRED EMBODIMENT

FIG. 1 is a block diagram of a system which puts into practice an embodiment of the method of the present invention. Referring to FIG. 1, a switch 1 selects one of contacts 1a and 1b under control of a switching pulse SW. A field signal $S_2$ reproduced from a recording medium such as a magnetic disk and passed through a delay circuit 2 to be delayed by ½H is applied to the contact 1a as a field signal $S_1$. The field signal $S_2$ is also applied directly to the contact 1b. Accordingly, the field signal $S_1$ delayed by ½H and the field signal $S_2$ not delayed appear alternately at an output terminal 1c of the switch 1. The signal appearing from the output terminal 1c of the switch 1 provides a frame signal $S_3$ which is obtained by the interlaced scanning. For this purpose, it is required that the video signals of the fields adjacent to each other with respect to time in the frame signal $S_3$ are displaced by ½H relative to each other, and, also, their vertical scanning signals maintain the time interval of 1 V therebetween. It is the switching pulse SW which is applied to the switch 1 for selecting the field signal $S_1$ or $S_2$ so as to satisfy the above condition. This switching pulse SW is produced by the combination of a flip-flop circuit 3, two monostable multivibrator circuits 4, 5 and an Ex-NOR circuit 6. The state of the output $Q_3$ of the flip-flop circuit 3 changes each time a trigger pulse PG is applied thereto. The trigger pulse signal PG may be produced in a manner as described in, for example, Japanese Utility Model Application Laid-open No. 58-69372 (1983). In the cited application, rotation of a magnet embedded in a center core of a magnetic disk is picked up by a pickup head to produce such a trigger pulse signal PG. Thus, means for producing the trigger pulse PG is well known in the art. The output $Q_3$ of the flip-flop circuit 3 is applied to the monostable multivibrator circuit 4 and to one input terminal 6a of the two-input Ex-NOR circuit 6. The ouput $\overline{Q}_5$ of the monostable multivibrator circuit 5 is applied to the other input terminal 6b of the Ex-NOR circuit 6, and the output $Q_4$ of the monostable multivibrator circuit 4 is applied to the monostable multivibrator circuit 5. In the form shown in FIG. 1, the monostable multivibrator circuit 4 is triggered by the trailing edge of the output $Q_3$ of the flip-flop circuit 3 and generates a pulse lasting for a period of 5.5H. On the other hand, the monostable multivibrator circuit 5 is triggered by the trailing edge of the output $Q_4$ of the monostable multivibrator circuit 4 and generates a pulse lasting for a period of 6.5H.

FIGS. 2(a) to 2(h) show waveforms appearing from the various blocks in the block diagram shown in FIG. 1.

The operation of the system which puts into practice an embodiment of the method according to the present invention will be described with reference to FIGS. 2(a) to 2(h). The trigger pulse PG shown in FIG. 2(a) rises to its high level at time which is, for example, 7H before the vertical synchronizing signal period Syn 21 of the field signal $S_2$ reproduced from the magnetic disk and shown in FIG. 2(f). Accordingly, the output $Q_3$ of the flip-flop circuit 3 has a waveform which rises to its high level at time which is 7H before the vertical synchronizing signal period Syn 21, remains in the high level for a period of 1 V and then falls to its low level, as shown in FIG. 2(b). Such a pulse $Q_3$ appears repeatedly at a time interval of 2V. The output $Q_4$ of the monostable multivibrator circuit 4 has a waveform which rises to its high level at the fall time of the output $Q_3$ of the flip-flop circuit 3, remains in the high level a period of 5.5H and then falls to its low level, as shown in FIG. 2(c). That is, the output $Q_4$ of the monostable multivibrator circuit 4 rises to its high level at time which is 7H before the vertical synchronizing signal period Syn 22 of the field signal $S_2$ of the next field. The output $\overline{Q}_5$ of the monostable multivibrator circuit 5 falls to its low level at the fall time of the output $Q_4$ of the monostable multivibrator circuit 4, remains in the low level for a period of 6.5H and then rises to its high level, as shown in FIG. 2(d). Therefore, the switching pulse SW, which is the output of the Ex-NOR circuit 6 and represents the Ex-NOR logic of the inputs $Q_3$ and $\overline{Q}_5$, has a waveform which rises to its high level at time which is 7H before the vertical synchronizing signal period Syn 21, falls to its low level after remaining in the high level for a period of 1 V, rises to its high level again at time which is 5.5H after its rise time, and falls to its low level again after remaining in the high level for a period of 6.5H, as shown in FIG. 2(e). Such a pulse SW appears repeatedly at a time interval of 2 V. The switching pulse SW controls the switch 1 so that the switch 1 selects the contacts 1a and 1b when the switching pulse SW is in its high and low levels respectively.

FIGS. 2(f) and 2(g) show schematically the waveforms of the field signals $S_2$ and $S_1$ alternately selected by the switching pulse SW respectively. FIG. 2(h) shows schematically the waveform of the frame signal $S_3$ converted as a result of selection of the field signals $S_2$ and $S_1$. In FIGS. 2(f) to 2(h), the symbols Vid, Syn, Ef and Eb designate the video signal period, vertical synchronizing signal period, preceding equalizing pulse period and succeeding equalizing pulse period respectively. The suffixes 1, 2 and 3 are added to the above symbols to indicate that those periods belong to the field signal $S_1$, field signal $S_2$ and frame signal $S_3$ respectively. Further, the vertical lines in the periods Vid, Syn, Ef and Eb indicate the timings of the horizontal synchronizing signal, vertical synchronizing signal and equalizing pulses respectively.

It will be apparent from reference to FIGS. 2(f) to 2(h) that the switching pulse SW rises to its high level before the preceding equalizing pulse period Ef21 of the field signal $S_2$, falls to its low level after remaining in the high level for the period of 1 V, rises to its high level again during the preceding equalizing pulse period Ef22 of the next field signal $S_2$ and falls to its low level again during the succeeding equalizing pulse period Eb22 of the field signal $S_2$. When the switching pulse SW is in its high level, the field signal $S_1$ delayed by the delay circuit 2 is selected, while when the switching pulse SW is in its low level, the field signal $S_2$ not delayed is selected, so that there occurs a time lag of 0.5H between the video signals belonging to the adjacent fields respectively in the frame signal $S_3$. In all the cases, the vertical synchronizing signal is selected from the field signal $S_1$, and the time interval of 1 V is maintained between the vertical synchronizing signals belonging to the adjacent fields respectively in the frame signal $S_3$. The symbols $SW_{p1}$ and $SW_{p2}$ in FIG. 2 indicate the points of switching by the trigger pulses PG.

In the aforementioned embodiment of the present invention, the rise time of the trigger pulse PG is set at the time which is 7H before the vertical synchronizing period $Syn_2$ of the field signal $S_2$. However, in principle, the trigger pulse PG may rise to its high level at any time before the preceding equalizing pulse period $Ef_2$ of the field signal $S_2$. Similarly, the duration of the pulse $Q_4$ generated from the monostable multivibrator circuit 4 may be freely selected between the rise time of the trigger pulse PG and the preceding equalizing pulse period Ef. Also, the duration of the pulse $\overline{Q}_5$ generated from the monostable multivibrator circuit 5 may be freely selected between the end point of the duration of the pulse $Q_4$ generated from the monostable multivibrator circuit 4 and the succeeding equalizing pulse period Eb. Thus, the combination of the 3H preceding equalizing pulse period Ef and the 3H succeeding equalizing pulse period Eb in the frame signal $S_3$ and the combination of the 3.5H preceding equalizing pulse period Ef and the 2.5H succeeding equalizing pulse period Eb in the frame signal $S_3$ are repeated for the individual fields. The present invention contributes to the desired satisfactory interlaced scanning from this aspect too.

It will be understood from the foregoing detailed description of the present invention that a switching pulse is generated which rises to its high level before the period of preceding equalizing pulses in one field, remains in its high level for a period of 1 V, then falls to its low level, rises to its high level again during the period of preceding equalizing pulses in the next field and falls to its low level again during the period of succeeding equalizing pulses and which repeats the above state at a time interval of 2 V. Such a switching pulse signal is applied as a control signal to a switch by which a field signal delayed by ½H and the field signal not delayed are alternately selected to convert the field signal into a frame signal. Therefore, not only the converted frame signal can realized the interlaced scanning, but also the structure of the circuit can be simplified.

I claim:

1. A method for conversion from a field signal to a frame signal in which a field signal delayed by a ½ horizontal scanning period and the field signal not subjected to any delay are alternately selected at a time interval of one vertical scanning period by changing over a switch, wherein said switch is changed over under control of a switching pulse which attains a first logic level before the period of preceding equalizing pulses in one field, remains in the first logic level for one vertical scanning period, then changes to a second logic level opposite to the first logic level, attains the first logic level again during the period of preceding equalizing pulses in the next field, and reverts to the opposite logic level again during the period of succeeding equalizing pulses and which repeats the above state at a time interval of two vertical scanning periods.

2. A system for conversion from a field signal to a frame signal, comprising a switch receiving a field signal delayed by a ½ horizontal scanning period and the field signal not subjected to the delay as its inputs and selectively alternately passing these field signals therethrough, and switching pulse generating means for generating a switching pulse which attains a first logic level before the period of preceding equalizing pulses in one field, remains in the first logic level for one vertical scanning period, then changes to a second logic level opposite to the first logic level, attains the first logic level again during the period of preceding equalizing pulses in the next field, and reverts to the opposite logic level again during the period of succeeding equalizing pulses and which repeats the above state at a time interval of two vertical scanning periods, said switching pulse being applied to change over said switch.

3. A conversion system as claimed in claim 2, wherein said switching pulse generating means includes first circuit means whose output state changes each time a trigger pulse attaining a first logic level and remaining in the first logic level for a short time before the period of preceding equalizing pulses in one field is applied at a time interval of one vertical scanning period, second circuit means for generating an output which attains a first logic level at the trailing edge of the output of said first circuit means, remains in the first logic level for a predetermined period of time and changes to a second logic level opposite the first logic level during the period of preceding equalizing pulses in the next field, third circuit means for generating an output having the second logic level at the trailing edge of the output of said second circuit means, remains in the second logic level for a predetermined period of time and changes to the first logic level during the period of succeeding equalizing pulses in the next field, and fourth circuit means whose output state changes depending on whether the level of the output of said first circuit means is the same as or differs from that of said third circuit means thereby generating the switching pulse changing over said switch.

4. A conversion system as claimed in claim 3, wherein said first circuit means is a flip-flop circuit, said second and third circuit means are monostable multivibrators, and said fourth circuit means is an Ex-NOR circuit.

* * * * *